United States Patent [19]

Shigenaka

[11] Patent Number: 4,960,969
[45] Date of Patent: Oct. 2, 1990

[54] METHOD OF PROCESSING AND TRANSFERRING VEHICLE BODY MEMBERS WITH A ROBOT

[75] Inventor: Makoto Shigenaka, Hiroshima, Japan

[73] Assignee: Mazda Motor Corporation, Hiroshima, Japan

[21] Appl. No.: 361,951

[22] Filed: Jun. 6, 1989

[30] Foreign Application Priority Data

Jun. 11, 1988 [JP] Japan ................. 63-144166

[51] Int. Cl.⁵ ............................................. B23K 11/10
[52] U.S. Cl. ..................................... 219/91.2; 29/469; 901/42
[58] Field of Search ......................... 219/91.2; 228/4.1; 29/469, 783; 901/42

[56] References Cited

FOREIGN PATENT DOCUMENTS 60-118391  6/1985  Japan .
63-11285   1/1988  Japan .
63-17188   1/1988  Japan .

Primary Examiner—Clifford C. Shaw
Attorney, Agent, or Firm—Sixbey, Friedman, Leedom & Ferguson

[57] ABSTRACT

A method of processing and transferring vehicle body members with a robot, in which each of a plurality of vehicle body members is processed with a processing device attached to a robot and then transferred to an entrance to a first work station and an entrance to a second work station successively with a holding device attached to the robot in place of the processing device in such a manner that, on the occasion of transfer of one of the vehicle body members to the entrance to the first work station, the holding device is released from the robot together with the vehicle body member with which the holding device engages so that the vehicle body member accompanied with the holding device is conveyed into the first work station and therefore the processing device can be attached to the robot in a relatively short time for processing the next one of the vehicle body members and then can be changed in relation to the robot for the holding device also in a relatively short time for transferring the vehicle body member having been subjected to the predetermined process in the first work station to the entrance to the second work station.

18 Claims, 6 Drawing Sheets

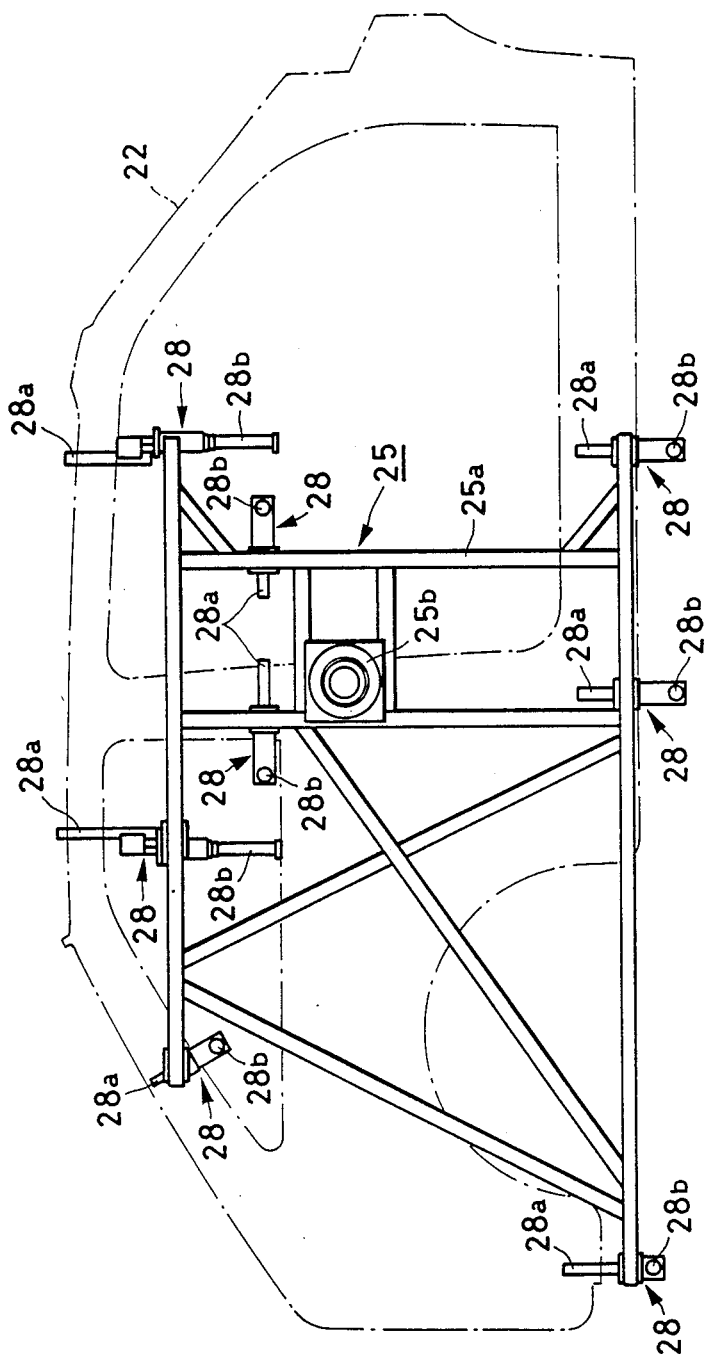

METHOD OF PROCESSING AND TRANSFERRING VEHICLE BODY MEMBERS WITH A ROBOT

BACKGROUND OF THE INVENTION

1. Field of the Invention

The present invention relates to a method of processing and transferring vehicle body members with a robot, in which the vehicle body members are processed with a processing device attached to the robot and then transferred to be carried into a work station for a successive processing with a holding device attached to the robot in place of the processing device.

2. Description of the Prior Art

In a vehicle body assembly line, various kinds of work are carried out with robots for the purpose of mechanizing or automatizing processes of assembling vehicle bodies. In this connection, there has been proposed, in the case of assembling a body panel member with a plurality of subdivided components, to use a robot for transferring the subdivided body panel components to a work receiving base and for welding the subdivided body panel components transferred to the work receiving base to together so as to constitute the body panel member, as disclosed in, for example, the Japanese patent application published before examination under publication number 60-118391.

In a previously proposed vehicle body assembly line in which a robot used for transferring and welding subdivided body panel components constituting a body panel member, as shown in FIG. 1, a robot 1 is installed between two work stations $ST_1$ and $ST_2$, at each of which the body panel member is subjected to a predetermined work, and a panel welding table 2 is disposed in the vicinity of the robot 1. A body side panel member 3 which is constituted with a plurality of subdivided body panel components is placed on the panel welding table 2.

The robot 1 is operative first to move an end portion of an arm 1a thereof into a welding gun holder 5 and a resistance welding gun 6 having been held by the welding gun holder 5 is removed from the welding gun holder 5 to be attached to the end portion of the arm 1a of the robot 1. The resistance welding gun 6 attached to the end portion of the arm 1a of the robot 1 is moved by the robot 1 to be put on the body side panel member 3 placed on the panel welding table 2 and operative to provide resistance welding at each of portions of the body side panel member 3 which is to be welded. After the resistance welding, the resistance welding gun 6 is moved by the robot 1 into the welding gun holder 5 and removed from the end portion of the arm 1a of the robot 1 to be held by the welding gun holder 5.

The robot 1 is further operative to move the end portion of the arm 1a into a panel holder supporting portion 7 and a panel holder 8 having been supported by the panel holder supporting portion 7 is removed from the panel holder supporting potion 7 to be attached to the end portion of the arm 1a of the robot 1. The panel holder 8 attached to the end portion of the arm 1a of the robot 1 is caused to engage with the body side panel member 3 placed on the panel welding table 2 and having been welded so as to hold the same.

Then, the robot 1 is operative to transfer the body side panel member 3 held by the panel holder 8 which is attached to the end portion of the arm 1a of the robot 1 to a panel carrier 9 which is provided for conveying the body side panel member 3 into and out of the work station $ST_1$ wherein the body side panel member 3 is subjected to finish processing. The panel holder 8 is caused to release the body side panel member 3 to put the same on the panel carrier 9 and the body side panel member 3 is conveyed into the work station $ST_1$ by the panel carrier 9. After that, the panel holder 8 is moved by the robot 1 into the panel holder supporting portion 7 and removed from the end portion of the arm 1a of the robot 1 to be supported by the panel holder supporting portion 7.

Next, the robot 1 is operative again to move the end portion of the arm 1a into the welding gun holder 5 and the resistance welding gun 6 having been held by the welding gun holder 5 is removed from the welding gun holder 5 to be attached to the end portion of the arm 1a of the robot 1. The resistance welding gun 6 attached to the end portion of the arm 1a of the robot 1 is moved by the robot 1 to be put on a body side panel member 3 placed newly on the panel welding table 2 and operative to provide resistance welding at each of portions of the new body side panel member 3 which is to be welded. Within the duration of such resistance welding, the finish processing for the body side panel member 3 in the work station $ST_1$ is completed and the body side panel member 3 having been projected to finish processing is conveyed out of the work station $ST_1$ by the panel carrier 9.

After the resistance welding on the new body side panel member 3, the resistance welding gun 6 is moved again by the robot into the welding gun holder 5 and removed from the end portion of the arm 1a of the robot 1 to be held by the welding gun holder 5.

The robot 1 is operative again to move the end portion of the arm 1a into the panel holder supporting portion 7 and the panel holder 8 having been supported by the panel holder supporting portion 7 is removed from the panel holder supporting potion 7 to be attached to the end portion of the arm 1a of the robot 1. The panel holder 8 attached to the end portion of the arm 1a of the robot 1 is caused to engage with the body side panel member 3 placed on the panel carrier 9 and having been conveyed out of the work station $ST_1$ so as to hold the same.

Then, the robot 1 is operative to transfer the body side panel member 3 held by the panel holder 8 to a panel carrier 10 which is provided for conveying the body side panel member 3 into the work station $ST_2$ wherein the body side panel member 3 having been subjected to finish processing is arranged for being incorporated with another vehicle body member. The panel holder 8 is caused to release the body side panel member 3 to put the same on the panel carrier 10 and the body side panel member 3 is conveyed into the work station $ST_2$ by the panel carrier 10. Then, the panel holder 8 attached to the end portion of the arm 1a of the robot 1 is caused by the robot 1 to engage with the body side panel member 3 placed on the panel welding table 2 and having been welded so as to hold the same.

The robot 1 is further operative to transfer the body side panel member 3 held by the panel holder 8 to the panel carrier 9 provided for conveying the body side panel member 3 into and out of the work station $ST_1$. The panel holder 8 is caused to release the body side panel member 3 to put the same on the panel carrier 9 and the body side panel member 3 is conveyed into the work station $ST_1$ by the panel carrier 9. Then, the panel holder 8 is moved by the robot 1 into the panel holder supporting portion 7 and removed from the end portion of the arm 1a of the robot 1 to be supported by the panel holder supporting portion 7.

After that, the robot 1 starts the next cycle of operation with moving the end portion of the arm 1a into the welding gun holder 5 so that the resistance welding gun 6 is removed from the welding gun holder 5 to be attached to the end portion of the arm 1a of the robot 1 and repeats the above described operations successively.

In the case where the resistance welding on the body side panel member 3 and the transfer of the body side panel member 3 having been subjected to the resistance welding are carried out with the robot 1 provided in common as aforementioned, whenever the operation of the robot 1 is switched from the resistance welding on the body side panel member 3 to the transfer of the body side panel member 3 having been subjected to the resistance welding or vice versa, the resistance welding gun 6 is removed from the end portion of the arm 1a of the robot 1 to be held by the welding gun holder 5 and then the panel holder 8 is removed from the panel holder supporting portion 7 to be attached to the end portion of the arm 1a of the robot 1, or the panel holder 8 is removed from the end portion of the arm 1a of the robot 1 to be supported by the panel holder supporting portion 7 and then the resistance welding gun 6 is removed from the welding gun holder 5 holder to be attached to the end portion of the arm 1a of the robot 1. This results in that a relatively long time is spent for each change between the resistance welding gun 6 and the panel holder 8 in relation to the end portion of the arm 1a of the robot 1 and therefore the robot 1 is put in such a situation as to be compelled to operate with undesirably low working efficiency.

OBJECTS AND SUMMARY OF THE INVENTION

Accordingly, it is an object of the present invention to provide a method of processing and transferring vehicle body members with a robot, in which the vehicle body members are processed and then transferred to be carried into a working station for a successive processing respectively with a processing device and a holding device attached selectively to the robot and which avoids the aforementioned disadvantage and problem encountered with the prior art.

Another object of the present invention is to provide a method of processing and transferring vehicle body members with a robot, in which the vehicle body members are processed and then transferred to be carried into a working station for a successive processing respectively with a processing device and a holding device attached selectively to the robot, and the robot can be operative to work with improved working efficiency.

A further object of the present invention is to provide a method of processing and transferring vehicle body members with a robot, in which the vehicle body members are processed and then transferred to be carried into a working station for a successive processing respectively with a processing device and a holding device attached selectively to the robot, and one of the processing device and the holding device can be changed for the other of the processing device and the holding device in relation to the robot in a relatively short time.

According to the present invention, there is provided a method of processing and transferring vehicle body members with a robot comprising the steps of processing a first vehicle body member with a processing device attached to the robot which is installed between first and second work stations adjoining each other, holding the first vehicle body member with a holding device attached to the robot in place of the processing device, moving the robot to transfer the first vehicle body member held by the holding device to an entrance to the first work station, releasing the holding device engaging with the first vehicle body member from the robot so as to allow the first vehicle body member accompanied with the holding device to be conveyed into the first work station, processing a second vehicle body member with the processing device attached again to the robot, attaching the holding device engaging with the first vehicle body member having been subjected to a predetermined processing in the first work station to the robot, moving the robot to transfer first vehicle body member having been subjected to the predetermined processing in the first work station to an entrance to the second work station, releasing the first vehicle body member from the holding device attached to the robot so as to allow the first body member to be conveyed into the second work station, moving the robot to transfer the second vehicle body member held by the holding device to the entrance to the first work station, and releasing the holding device engaging with the second vehicle body member from the robot so as to allow the second vehicle body member accompanied with the holding vehicle body member accompanied with the holding device to be conveyed into the first work station With the method thus comprising in accordance with the present invention, after the vehicle body member is transferred by the robot to the entrance to the first work station, the holding device is released from the robot together with the vehicle body member with which the holding device engages so that the vehicle body member accompanied with the holding device is conveyed into the first work station, and therefore the processing device can be attached in a relatively short time for processing the next vehicle body member and then can be changed in relation to the robot for the holding device also in a relatively short time for transferring the vehicle body member having been subjected to the predetermined process in the first work station to the entrance to the second work station. Consequently, the robot can be operative to work with improved working efficiency.

The above, and other objects, features and advantages of the present invention will become apparent from the following detailed description which is to be read in conjunction with the accompanying drawings.

BRIEF DESCRIPTION OF THE DRAWINGS

FIGS. 4 and 5 are schematic plan and side views showing a panel holder used in the part of the vehicle body assembly line shown in FIG. 2;

DESCRIPTION OF THE PREFERRED EMBODIMENT

Now, an embodiment of method of processing and transferring vehicle body members with a robot according to the present invention will be described in detail with reference to the accompanying drawings hereinafter.

Figure 1:
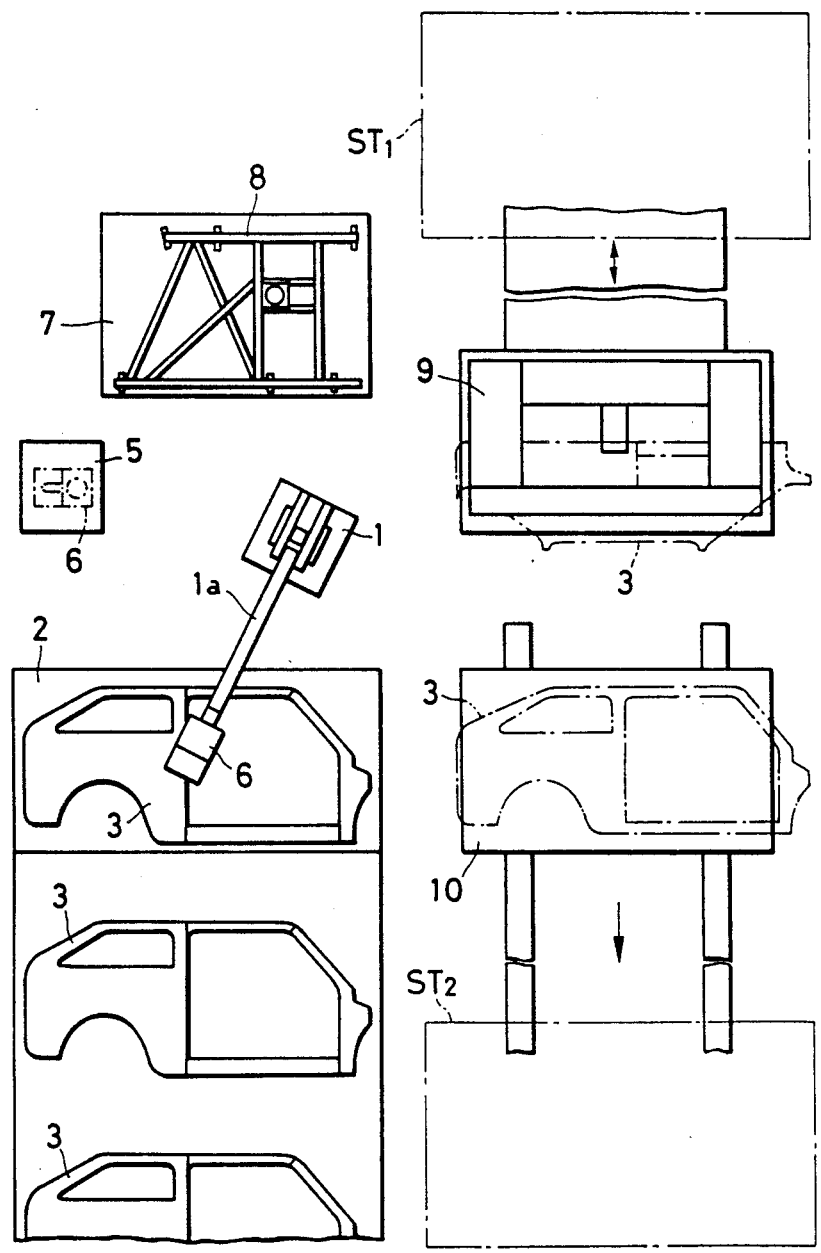
FIG. 1 is a schematic plan view showing a part of a previously proposed vehicle body assembly line in which a robot is employed.
Figure 2:
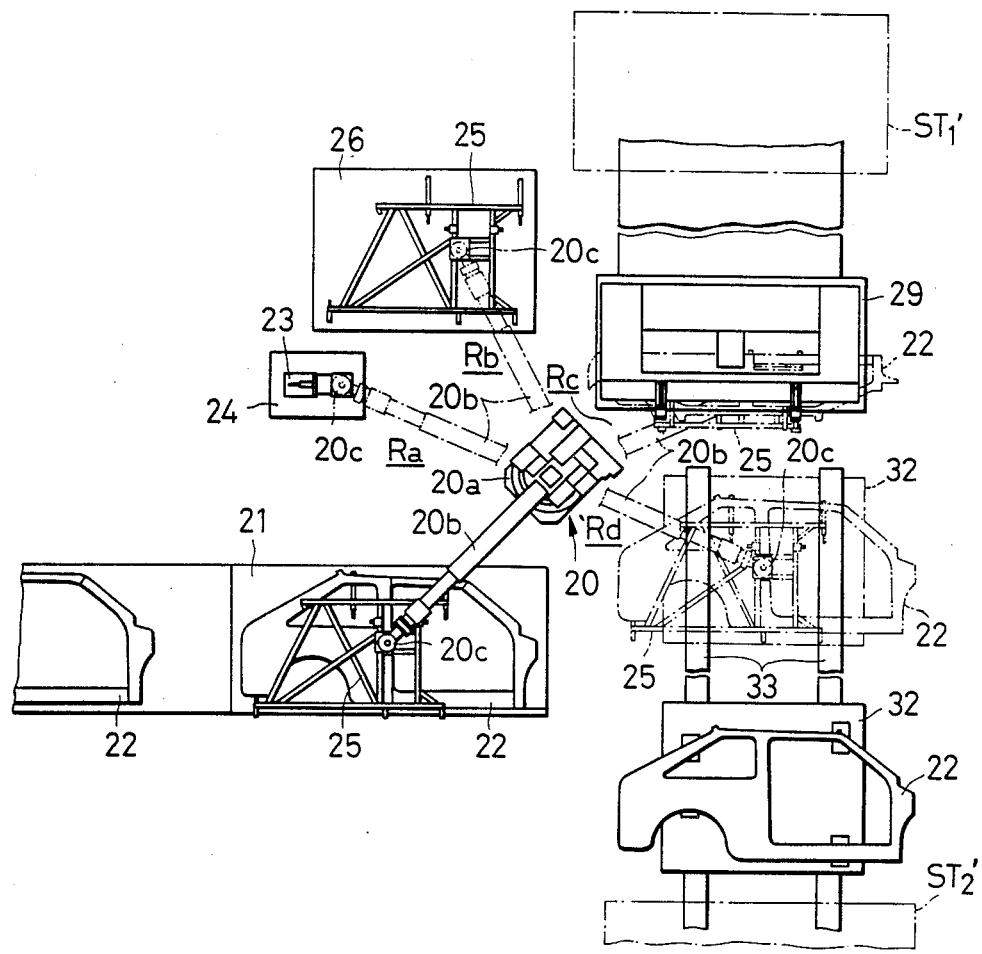
FIG. 2 is a schematic plan view showing a part of a vehicle body assembly line to which an example of a method of processing and transferring vehicle body members with a robot according to the present invention is carried out.

FIG. 2 shows a part of a vehicle body assembly line in which body panel members are treated in accordance with an example of the method according to the present invention.

In the part of the vehicle body assembly line shown in FIG. 2, a robot 20 is installed between first and second work stations $ST_1'$ and $ST_2'$ adjoining each other, and a panel welding table 21 is disposed in the vicinity of the robot 20. Each of body side panel members 22 constituted with a plurality of subdivided body panel components and having seams at each of which welding is to be provided is placed on the panel welding table 21 successively. The robot 20 comprises a body 20a rotatable at an angle of 360 degrees and an arm 20b extending from the body 20a to be movable vertically and rotatable around its axis. The arm 20b is provided at its end with a connecting portion 20c.

A welding gun holder 24 for holding a resistance welding gun 23 which is used for providing resistance welding to the body side panel member 22 and a panel holder supporting portion 26 for supporting a panel holder 25 which is caused to engage with the body side panel member 22 to hold the same are disposed separately within the reach of the robot 20. Each of the resistance welding gun 23 and the panel holder 25 is able to be attached to the arm 20b of the robot 20.

Figure 3:
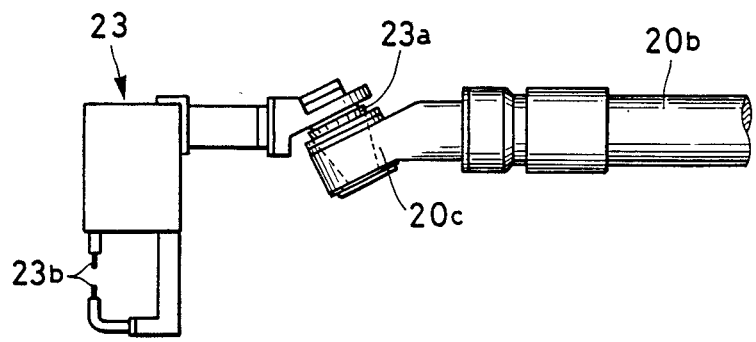
FIG. 3 is a schematic side view showing a resistance welding gun and a portion of a robot used in the part of the vehicle body assembly line shown in FIG. 2.

As shown in FIG. 3, the resistance welding gun 23 has a connecting projection 23a and welding electrodes 23b, and the connecting projection 23a is able to be connected with the connecting portion 20c of the arm 20b of the robot 20 so that the resistance welding gun 23 is attached to the arm 20b. The welding electrodes 23b come into contact with portions of the body side panel member 22 each including the seam on the body side panel member 22.

Figure 5:
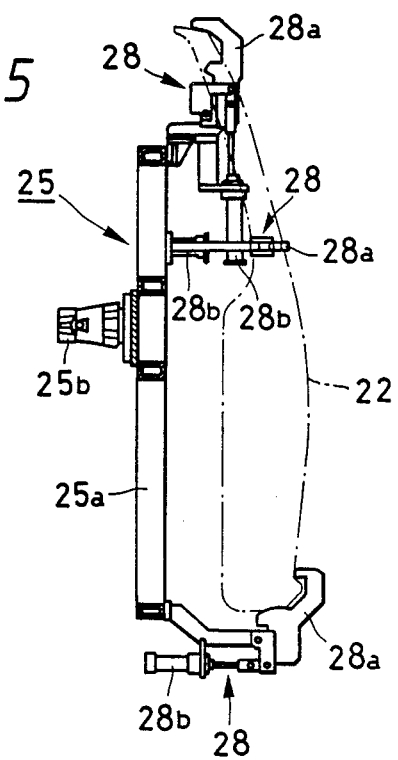
Figure 6:
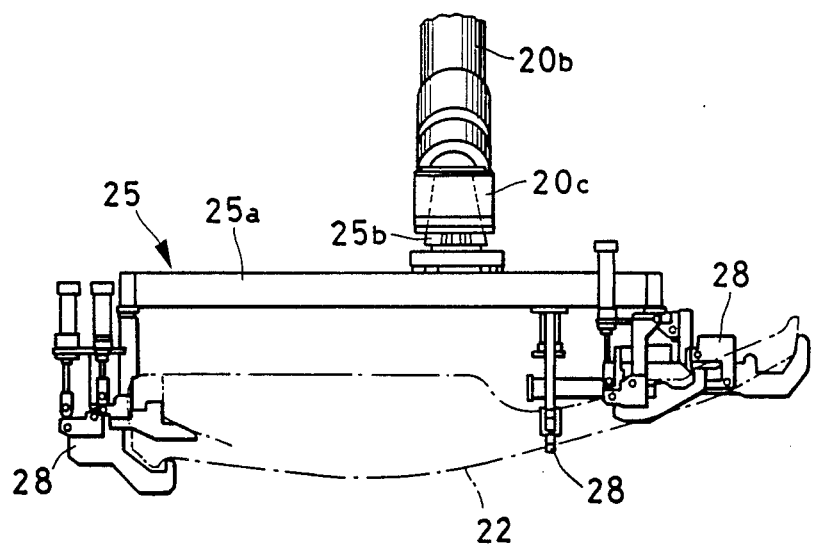
FIG. 6 is a schematic side view showing the panel holder shown in FIGS. 4 and 5 attached to the portion of robot shown in FIG. 3.

As shown in FIGS. 4 and 5, the panel holder 25 comprises a body 25a composed of a combination of a plurality of pipe members and a connecting projection 25b projecting from the body 25a. A plurality of clampers 28 for engaging the body side panel member 22 to hold the same as shown with dot-dash lines in FIGS. 4 and 5 are provided on the body 25a. Each of the clampers 28 comprises an engaging portion 28a for coming into contact with the body side panel member 22 and an air cylinder 28b operative to cause the engaging portion 28a to come into contact with the body side panel member 22 selectively. The connecting projection 25b is able to be connected with the connecting portion 20c of the arm 20b of the robot 20 so that the panel holder 25 is attached to the arm 20b, as shown in FIG. 6.

Figure 7:
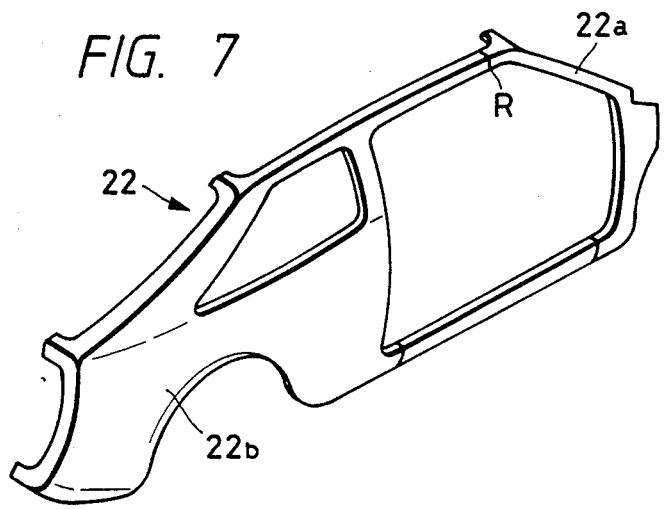
FIG. 7 is a schematic illustration showing an example of a body side panel member to which an example of a method of processing and transferring vehicle body members with a robot according to the present invention is applied.
Figure 8:
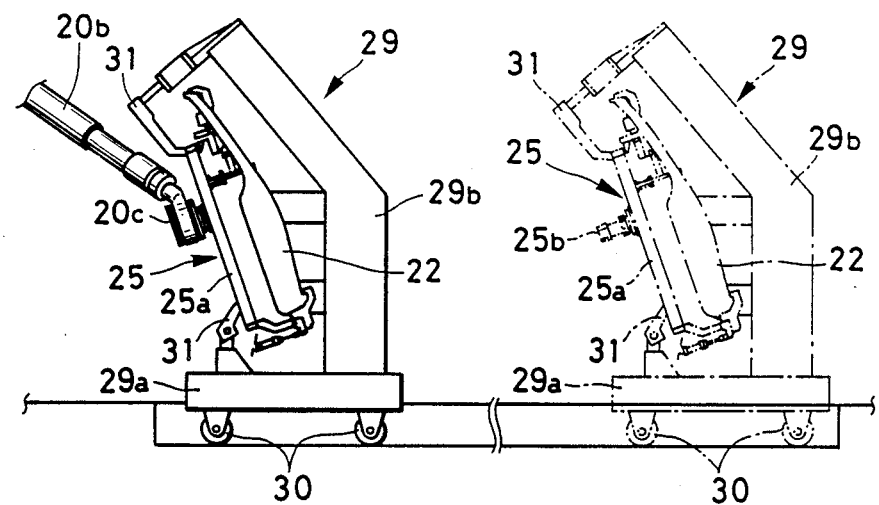
FIG. 8 is a schematic side view used for explaining a panel carrier used in the part of the vehicle body assembly line shown in FIG. 2.

In the first work station $ST_1'$, the body side panel member 22 having a portion R where inert gas shielded metal arc welding (MIG welding) has been carried out at, for example, a junction between a front pillar outer component 22a and a rear fender component 22b, as shown in FIG. 7, and conveyed thereinto is subjected to finish processing for grinding an outer surface of the portion of the MIG welding thereof at the outside of the reach of the robot 20. Further, in the case where the MIG welding has not been provided on surface of the portion of the MIG welding thereof. Further, in the case where the MIG welding has not been provided on the body side panel member 22 which is conveyed into the first work station $ST_1'$ due to some trouble, such as breakdown of a robot for MIG welding, the body side panel member 22 is subjected to MIG welding in the first work station $ST_1'$ before the finish processing. At an entrance to the first work station $ST_1'$, a panel carrier 29 is provided for conveying the body side panel member 22 into the first work station $ST_1'$ and then conveying the body side panel member 22 having been subjected to the finish processing out of the first work station $ST_1'$. As shown in FIG. 8, the panel carrier 29 comprises a base 29a having caster rollers 30 and a panel supporting portion 29b standing on the base 29a. Each of the base 29a and the panel supporting portion 29b is provided with clamper 31 for engaging with the panel holder 25.

When the body side panel member 22 is conveyed into the first work station $ST_1'$, first the body side panel member 22 held by the panel holder 25 which is attached to the arm 20b of the robot 20 is transferred by the robot 20 to the entrance to the first work station $ST_1'$ and the panel holder 25 holding the body side panel member 22 is held through clampers 31 by the base 29a and the panel supporting portion 29b constituting the panel carrier 29, as shown with solid lines in FIG. 8. Then, the connecting projection 25b of the panel holder 25 is disconnected with the connecting portion 20c provided on the arm 20b of the robot 20 so that the panel holder 25 is released, together with the body side panel member 22, from the arm 20b of the robot 20 to be supported by the panel carrier 29. After that, the panel carrier 29 is operative to convey the body side panel member 22 accompanied with the panel holder 25 into the first work station $ST_1'$.

On the other hand, in the second work station $ST_2'$, the body side panel member having been subjected to the finish processing in the first work station $ST_1'$ and conveyed thereinto is arranged to be incorporated with a lower body member, such as a floor panel member, in another part of the vehicle body assembly line. At an entrance to the second work station $ST_2'$, a panel carrier 32 is provided for conveying the body side panel member 22 into the second work station $ST_2'$. As shown in FIG. 2, the panel carrier 32 is put on rails 33 and operative to carry the body side panel member 22, which has been subjected to the finish processing in the first work station $ST_1'$ and placed thereon, along the rails 33 into the second work station $ST_2'$.

Under such an arrangement, when the example of the method according to the present invention is carried out, first one of the body side panel members 22 is placed on the panel welding table 21 and the robot 20 is operative to position the arm 20b as indicated with dot-dash lines marked with Ra in FIG. 2 so as to move the connecting portion 20c of the arm 20b into the welding gun holder 24. The connecting portion 20c of the arm 20b is connected with the connecting projection 23a of the resistance welding gun 23 having been held by the welding gun holder 24 and thereby the resistance welding gun 23 is removed from the welding gun holder 24 to be attached to the arm 20b of the robot 20. The resistance welding gun 23 attached to the arm 20b of the robot 20 is moved by the robot 20 to be put on the body side panel member 22 placed on the panel welding table 21. The welding electrodes 23b of the resistance welding gun 23 are caused to come into contact with the portions of the body side panel member 22 each including the seam on the body side panel member 22 and operative to provide resistance welding at those portions of the body side panel member 22.

After the resistance welding, the robot 20 is operative to cause the arm 20b to be positioned again as indicated with the dot-dash lines marked with Ra in FIG. 2 so as to return the resistance welding gun 23 attached to the arm 20b to the welding gun holder 24. Then, the resistance welding gun 23 is removed from the arm 20b of the robot 20 to be held by the welding gun holder 24.

The robot 20 is further operative to position the arm 20b as indicated with dot-dash lines marked with Rb in FIG. 2 so as to move the connecting portion 20c of the arm 20b into the panel holder supporting portion 26. The connecting portion 20c of the arm 20b is connected with the connecting projection 25b of the panel holder 25 having been supported by the panel holder supporting portion 26 and thereby the panel holder 25 is removed from the panel holder supporting portion 26 to be attached to the arm 20a of the robot 20. The panel holder 25 attached to the arm 20a of the robot 20 is caused by the robot 20 to engage through the engaging portions 28a of the clampers 28 with the body side panel member 22 placed on the panel welding table 21 and having been welded so as to hold the same, as shown with solid lines in FIG. 2.

Then, the robot 20 is operative to position the arm 20b as indicated with dot-dash lines marked with Rc in FIG. 2 so as to transfer the body side panel member 22 held by the panel holder 25 which is attached to the arm 20a of the robot 20 to the panel carrier 29 provided at the entrance to the first work station ST₁'. The panel holder 25 holding the body side panel member 22 is held through the clampers 31 by the base 29a and the panel supporting portion 29b constituting the panel carrier 29, and the panel holder 25 is released, together with the body side panel member 22, from the arm 20b of the robot 20 to be supported by the panel carrier 29. After that, the panel carrier 29 is operative to convey the body side panel member 22 accompanied with the panel holder 25 into the first work station ST₁'.

Next, the robot 20 is operative again to position the arm 20b as indicated with the dot-dash lines marked with Ra in FIG. 2 so as to move the connecting portion 20c of the arm 20b into the welding gun holder 24. The connecting portion 20c of the arm 20b is connected with the connecting projection 23a of the resistance welding gun 23 having been held by the welding gun holder 24 and thereby the resistance welding gun 23 is removed from the welding gun holder 24 to be attached to the arm 20a of the robot 20. The resistance welding gun 23 attached to the arm 20a of the robot 20 is moved by the robot 20 to be put on the next one of the body side panel members 22 placed newly on the panel welding table 21. The welding electrodes 23b of the resistance welding gun 23 are caused to come into contact with the portions of the new body side panel member 22 each including the seam on the new body side panel member 22 and operative to provide resistance welding at those portions of the new body side panel member 22. Within the duration of such resistance welding, the finish processing for the body side panel member 22 in the first work station ST₁' is completed and the body side panel member 22 having been subjected to the finish processing is conveyed out of the first work station ST₁' by the panel carrier 29.

After the resistance welding, the robot 20 is operative to cause the arm 20b to be further positioned as indicated with the dot-dash lines marked with Ra in FIG. 2 so as to return the resistance welding gun 23 attached to the arm 20b to the welding gun holder 24, and the resistance welding gun 23 is removed from the arm 20b of the robot 20 to be held by the welding gun holder 24. Then, the robot 20 is operative immediately to position the arm 20b as indicated with the dot-dash lines marked with Rc in FIG. 2 and to cause the connecting portion 20c of the arm 20b to be connected with the connecting projection 25b of the panel holder 25 by which the body side panel member 22 is held. Accordingly, the body side panel member 22 having been subjected to the finish processing is held by the panel holder 25 which is attached to the arm 20b of the robot 20, and the panel holder 25 is released from the clampers 31 provided on the panel carrier 29.

Then, the robot 20 is operative to position the arm 20b as indicated with dot-dash lines marked with Rd in FIG. 2 so as to transfer the body side panel member 22 having been subjected to the finish processing and held by the panel holder 25 which is attached to the arm 20b of the robot 20 to the panel carrier 32 provided at the entrance to the second work station ST₂'. The clampers 28 provided on the panel holder 25 are caused to release the body side panel member 22 to put the same on the panel carrier 32 and the body side panel member 22 is conveyed into the second work station ST₂' by the panel carrier 32.

After that, the panel holder 25 attached to the arm 20b of the robot 20 is caused by the robot 20 to engage through the engaging portions 28a of the clampers 28 with the new body side panel member 22 placed on the panel welding table 21 and having been welded so as to hold the same, and the robot 20 is operative again to position the arm 20b as indicated with the dot-dash lines marked with Rc in FIG. 2 so as to transfer the body side panel member 22 held by the panel holder 25 which is attached to the arm 20b of the robot 20 to the panel carrier 29 provided at the entrance to the first work station ST₁'. The panel holder 25 holding the body side panel member 22 is held through the clampers 31 by the base 29a and the panel supporting portion 29b constituting the panel carrier 29, and the panel holder 25 is released, together with the body side panel member 22, from the arm 20b of the robot 20 to be supported by the panel carrier 29. Then, the panel carrier 29 is operative to convey the body side panel member 22 accompanied with the panel holder 25 into the first work station ST₁'.

After that, the robot 20 starts the next cycle of operation with positioning the arm 20b as indicated with the dot-dash lines marked with Ra so as to move the connecting portion 20c of the arm 20b into the welding gun holder 24 to be connected with the resistance welding gun 23 held by the welding gun holder 24, and repeats the above described operations successively.

With the repetition of the aforementioned operations, the body side panel members 22 each provided with resistance welding on the panel welding table 21 and then subjected to the finish processing in the first work station ST$_1$' are conveyed successively into the second work station ST$_2$' to be arranged for being incorporated with the respective lower body members.

Although the body side panel members are treated in accordance with the example of the method according to the present invention in the above described embodiment, the method according to the present invention can be applied to various kinds of vehicle body members other than the body side panel members.

What is claimed is:

1. A method of processing and transferring vehicle body members with a robot comprising the steps of,
   providing a robot having a body and an arm extending from the body to be connected and disconnected selectively with each of a processing device and a holding device,
   processing a first vehicle body member with a processing device attached to the robot installed between first and second work stations adjoining each other,
   attaching a holding device to the robot,
   holding the first vehicle body member with the holding device attached to the robot in place of the processing device,
   moving the robot to transfer the vehicle body member held by the holding device to an entrance to the first work station,
   releasing the holding device engaging with the first vehicle body member from the robot so as to allow the first vehicle body member accompanied with the holding device to be conveyed into the first work station,
   attaching the processing device to the robot,
   processing a second vehicle body member with the processing device attached again to the robot during a period in which the first vehicle body member is subjected to a predetermined processing in the first work station,
   releasing the processing device from the robot,
   attaching the holding device engaging with the first vehicle body member having been subjected to a predetermined processing in the first work station to the robot,
   moving the robot to transfer the first vehicle body member having been subjected to the predetermined processing in the first work station to an entrance to the second work station,
   releasing the first vehicle body member from the holding device attached to the robot so as to allow the first body member to be conveyed into the second work station,
   moving the robot to transfer the second vehicle body member held by the holding device to the entrance to the first work station, and
   releasing the holding device engaging with the second vehicle body member from the robot so as to allow the second vehicle body member accompanied with the holding device to be conveyed into the first work station.

2. A method according to claim 1, wherein a position at which the first vehicle body member is placed immediately before the robot is operative to transfer the first vehicle body member held by the holding device to the entrance to the first work station and a position at which the second vehicle body member is placed when the processing device attached to the robot is operative to process the second vehicle body member are arranged to be substantially coincident with each other.

3. A method according to claim 2, wherein the processing device comprises a resistance welding gun for providing resistance welding to the first and second vehicle body members.

4. A method according to claim 1, wherein each of the first and second vehicle body members transferred to the entrance to the first work station is removed from the robot, together with the holding device, to be supported by a vehicle body member carrier and conveyed into and then conveyed out of the first work station by the vehicle body member carrier.

5. A method according to claim 1, wherein each of the first and second vehicle body members conveyed into the first work station is subjected to the predetermined processing at the outside of the reach of the robot.

6. A method according to claim 1, wherein said predetermined processing to which each of the first and second vehicle body members is subjected in the first work station includes at least finish processing for grinding an outer surface of a portion of each of the first and second vehicle body members where inert gas shielded metal arc welding is provided.

7. A method according to claim 1, wherein each of the first and second vehicle body members comprises a body side panel member.

8. A method according to claim 7, wherein the body side panel member conveyed into the second work station is arranged to be incorporated with a floor panel member.

9. A method according to claim 1, wherein the processing device and the holding device are attached selectively to the same portion of the robot.

10. A method according to claim 9, wherein the processing device comprises a resistance welding gun for providing resistance welding to the first and second vehicle body members.

11. A method according to claim 1, wherein said predetermined processing to which the first vehicle body members is subjected in the first work station is completed within a period of time in which the second body member is processed with the processing device attached to the robot.

12. A method according to claim 1, wherein the processing device comprises a resistance welding gun for providing resistance welding to the first and second vehicle body members, and said predetermined processing to which each of the first and second vehicle body members is subjected in the first work station includes at least finish processing for grinding an outer surface of a portion of each of the first and second vehicle body members where inert gas shielded metal arc welding is provided.

13. A method according to claim 1, wherein each of the processing device and the holding device is disposed at a predetermined position within the reach of the robot on the occasion of disconnecting with the arm of the robot.

14. A method according to claim 13, wherein the processing device comprises a resistance welding gun for providing resistance welding to the first and second vehicle body members.

15. A method according to claim 1, wherein the processing device comprises a resistance welding gun for providing resistance welding to the first and second vehicle body members.

16. A method according to claim 1, wherein the first work station is located at the outside of the reach of the robot.

17. A method of processing and transferring vehicle body members with a robot comprising the steps of,
- processing a first vehicle body member with a processing device attached to the robot installed between first and second work stations adjoining each other,
- releasing the processing device from the robot,
- attaching a holding device to the robot,
- holding the first vehicle body member with the holding device attached to the robot in place of the processing device,
- moving the robot to transfer the first vehicle body member held by the holding device to an entrance to the first work station,
- placing the holding device holding the first vehicle body member on a vehicle body member carrier which is located at the entrance to the first work station and clamping the holding device by a clamping means provided on the vehicle body member carrier,
- releasing the holding device engaging with the first vehicle body member from the robot so as to allow the first vehicle body member accompanied with the holding device to be conveyed into the first work station by the vehicle body member carrier,
- attaching the processing device again to the robot,
- processing a second vehicle body member with the processing device during a period of time in which the first vehicle body member is subjected to a predetermined processing in the first work station,
- releasing the processing device from the robot,
- attaching the holding device engaging with the first vehicle body member having been subjected to a predetermined processing in the first work station to the robot,
- releasing the holding device engaging with the first vehicle body member from the vehicle body member carrier by disengaging the clamping means,
- moving the robot to transfer the first vehicle body member having been subjected to the predetermined processing in the first work station to an entrance to the second work station,
- releasing the first vehicle body member from the holding device attached to the robot so as to allow the first body member to be conveyed into the second work station,
- holding the second vehicle body member with the holding device attached to the robot,
- moving the robot to transfer the second vehicle body member held by the holding device to the entrance to the first work station,
- placing the holding device holding the second vehicle body member on the vehicle body member carrier located at the entrance to the first work station and clamping the holding device by the clamping means provided on the vehicle body member carrier, and
- releasing the holding device engaging with the second vehicle body member from the robot so as to allow the second vehicle body member accompanied with the holding device to be conveyed into the first work station.

18. A method according to claim 17, wherein the holding device holding the vehicle body member is held through clampers by a base and a panel supporting portion of the vehicle body member carrier.

* * * * *